United States Patent Office 3,467,188
Patented Sept. 16, 1969

3,467,188
OIL RECOVERY PROCESS UTILIZING MINIATURE SLUG OF OIL-EXTERNAL MICELLAR DISPERSION
William B. Gogarty, Littleton, Colo., assignor to Marathon Oil Company, Findlay, Ohio, a corporation of Ohio
No Drawing. Filed Mar. 12, 1968, Ser. No. 712,345
Int. Cl. E21b 43/22
U.S. Cl. 166—274     10 Claims

ABSTRACT OF THE DISCLOSURE

Minislugs of oil-external micellar dispersions are injected into injection wells to increase the injectivity index of the well. It is postulated, inter alia, that the dispersion removes hydrocarbon from the sand pores immediately adjacent the well bore and also overcomes the adversities of "skin damage."

Background of the invention

United States Patent No. 3,254,714 teaches an oil recovery technique wherein a slug of a micellar dispersion selected from the group consisting of water-containing soluble oils and microemulsions are displaced through a petroleum reservoir toward production wells. The process of this patent is quite effective in secondary and tertiary oil recovery. However, we have found that relatively miniscule amounts of micellar dispersion can also be used to increase the effectiveness of secondary flooding operations.

Water injection rate in an injection well is dependent upon bottom hole pressure, relative permeability of the reservoir within the immediate vicinity of the well bore, pressure differential between the well bore and reservoir, etc. High injection rates are desirable from an economic and operational standpoint in secondary recovery processes. Because of reservoir geometry, i.e. injection of water at an area immediately adjacent to the well bore, injection rates are reduced as a consequence of the residual oil saturation within this immediate area. This residual oil causes a lower value of permeability with respect to water flow than would exist if the reservoir surrounding the well bore were 100% saturated with water. Also, adversities of "skin damage" impede the injection of water—from an operational basis this is realized by a very large pressure differential across the skin. Injection rates can be greatly improved by reducing the residual oil saturation in the immediate area (up to 20 feet away from the well bore) of the well bore and overcoming the adversities of skin damage.

This invention relates to the recovery of petroleum crudes by secondary recovery means and more particularly to the injection of a small slug of micellar dispersion to improve the injection index of injection wells.

Description of the invention

The term "micellar dispersion" as used herein is meant to include micellar solutions, "micro-emulsions" [Schulman and Montagne, Annals of the New York Academy of Sciences, 92, pp. 366–371 (1961)], "transparent" emulsions (Blair, Jr. et al., United States Patent No. 2,356,205) and micellar dispersion technology taught by C. G. Sumner, Clayton's, The Theory of Emulsions and Their Technical Treatment, 5th edition, pp. 315–320 (1954). Examples of useful micellar solutions include those taught in United States Patents Nos. 3,254,714, 3,275,075, 3,301,325, and 3,307,628. Micellar dispersions differ from emulsions in many ways, the strongest differentiation being that the former are thermodynamically stable whereas the latter are not.

In the process of this invention, a minute slug of micellar dispersion is injected into a formation through an injection well, and displaced toward a production well. Normally, the amount of slug need be sufficient to extend from the well bore only three to twenty feet into the formation. Preferably, the amount of injected slug need displace substantially all hydrocarbon from the pores in the formation adjacent the well bore to at least seven and no more than fifteen feet. In terms of reservoir pore volume, for example, the amount of injected slug at the ten foot radius in a reservoir of ten foot thickness in a ten acre pattern can be about 0.002 pore volume. It is realized that the slug will be dissipated prior to reaching a production well, however, the increase in injectivity index and the buildup of a small oil bank ahead of the injected soluble oil materially aids in the flooding operation.

Injectivity index as used herein is defined as the injection rate in barrels per day to the excess pressure above reservoir pressure which causes that injection rate. It can be defined by the formula $$\text{Injectivity Index} = I = \frac{q}{(p_w - p_e)} \text{ bbl./day/p.s.i.}$$

wherein $p_w$ is the sand-face pressure, $p_e$ is the reservoir static pressure measured at a point about equal distance between the injection and producing wells and $q$ is the injection rate in bbl./day.

The micellar dispersions are made up of a hydrocarbon external phase, an aqueous internal phase, and at least one surfactant. One or more co-surfactants (also identified as cosolvents, cosolubilizers, and semi-polar compounds) are useful in the dispersions. Also, electrolytes are useful in the dispersions. The micellar dispersions are, for purposes of this invention, relatively stable dispersions and can show some Tyndall effect, but generally do not. The micellar dispersions, obviously, will not be transparent if made up of certain crude oils or other components which contain various color bodies as impurities. The micellar dispersions used in this process are mobile in the formation. These micellar dispersions can contain other additives, e.g. corrosion and scale inhibitors, bactericides, etc. Examples of such dispersions can contain, by volume, from about 4% to about 85% hydrocarbon; from about 10 to about 90% water, and at least about 4% surfactant. In addition, up to about 5% or more by volume of cosurfactant and up to about 4% or more by weight of electrolyte in the aqueous phase can optionally be incorporated into the micellar dispersion.

Examples of hydrocarbon include crude oil (both sweet and sour), partially refined fractions thereof, e.g., side cuts from crude columns, crude column overheads, gas oils, kerosene, heavy naphthas, naphthas, straight-run gasoline, and liquefied petroleum gases, refined fractions of crude oil and halogenated hydrocarbons. Pure hydrocarbons are also useful, e.g., paraffinic compounds including liquefied petroleum gases, propane, pentane, heptane, decane, dodecane, etc.; cycloparaffin compounds including cyclohexane, etc.; aryl compounds including benzene, naphthalene, anthracene, etc.; alkylated products thereof including toluene, alkyl phenols, etc. and combinations of the hydrocarbons taught herein. Based on economics, the preferred hydrocarbon is one locally available and is crude oil. The unsulfonated hydrocarbon (e.g., heavy vacuum gas oils) in petroleum sulfonates is also useful.

The aqueous phase can be composed of soft, brackish, or brine water. Preferably, the water is soft but it can contain small amounts of salts which are compatible with the ions in the subterranean formations being flooded.

Surfactants include the various nonionic, cationic, and anionic surfactants. Examples of such surfactants include sodium glyceryl monolaurate sulfate,
dihexyl sodium succinate,
hexadecylnaphthalene sulfonate,
diethyleneglycol sulfate,
glycerol disulfoacetate monomyristate,
p-toluidene sulfate laurate,
p-chloroaniline sulfate laurate,
sodium sulfato oleylethylanilide,
triethanolamine myristate,
N-methyltaurine oleamide,
pentaerythritol monostearate,
polyglycerol monolaurate,
triethanolamine oleate,
morpholine stearate,
hexadecyl trimethylammonium chloride,
ditetradecyl dimethyl ammonium chloride,
n-dodecyl-diethyleneglycol sulfate,
monobutylphenyl phenol sodium sulfate,
triethanolamine laurate, or
triethanolamine oleate, and preferably the sodium salts of dialkylsuccinates containing preferably from about 6 to about 10 carbon atoms in each alkyl group.

Preferably, the surfactant is a petroleum sulfonate, also known as alkaryl sulfonates or alkaryl naphthenic sulfonates. Petroleum sulfonates can be obtained by sulfonating at least a portion of a sulfonatable hydrocarbon (e.g., gas oils) and then neutralizing the mixture, e.g., with ammonia, $NH_4OH$, $NaOH$, etc. Examples of sulfonates include those containing 60–100% active sulfonate. Unsulfonated hydrocarbon within the sulfonate is useful as the hydrocarbon phase of the dispersion. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates.

Examples of useful cosurfactants include alcohols, amino compounds, esters, aldehydes and ketones containing from 1 up to about 20 or more carbon atoms and more preferably from 3 to about 16 carbon atoms. The cosurfactant is preferably an alcohol, e.g., isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and secondary hexanols. Concentrations of from about 0.01% to more than about 5% by volume are useful in the micellar dispersion and more preferably from about 0.2% to about 3%. Mixtures of two or more cosurfactants are also useful.

Electrolytes useful within the micellar dispersions include inorganic bases, inorganic acids, inorganic salts, organic bases, organic acids, and organic salts. These electrolytes include those being strongly or weakly ionized. Preferably, the electrolytes are inorganic bases, inorganic acids and inorganic salts, examples include sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in United States Patent No. 3,330,344. The type and concentration of preferred electrolyte will depend on the hydrocarbon phase, aqueous phase, surfactant, cosulfactant, reservoir fluids and reservoir temperature.

Where the micellar dispersion utilizes chlorinated hydrocarbon as the external phase, it is preferentially prepared utilizing a nonionic surfactant such as the sodium sulfate derivative of 3,9-diethyl tridecanol-6 or the sodium sulfate derivative of 7-ethyl-2-methyl-undecanol-4. Amine detergents, for example, 1-hydroxy-ethyl-2-heptadecenyl glyoxalidine, are preferred where the water in the formation is acidic or contains relatively large amounts of calcium or heavy metal ions.

The type of surfactant utilized depends on the temperature of the formation, hardness, salinity, and pH of the formation water and the character of the water used to make up the micellar dispersions. It would be futile to use sodium oleate in a formation containing relatively high concentrations of calcium and magnesium ions, as the precipitated calcium and magnesium soaps could plug the formation. Where there is a natural surfactant in the crude, a surfactant having a similar ionic charge should be used to avoid precipitating an insoluble reaction product. Preferably, the micellar dispersion can emulsify large amounts of fresh water.

The micellar dispersions can be generally prepared by dissolving the surfactant in the hydrocarbon and then adding the water. However, the surfactant can also be included in the aqueous medium and then mixed with the hydrocarbon. Preferably, the surfactant and cosurfactant are dissolved in the hydrocarbon, and water is then added incrementally with agitation.

The amount of micellar dispersion injected into the formation depends upon the thickness of the oil-bearing or "pay" sand (that is, the permeable part of the formation containing crude oil in amounts feasible for recovering). Such oil-bearing sands can vary in thickness from about 4 feet or less to about 3,000 feet and possibly higher. From about 0.25 to about 10 or more barrels of micellar dispersion per vertical foot of oil-bearing sand is useful with this invention. Larger quantities may be useful, however, the increased cost associated therewith generally are not favorable with the results as compared to smaller quantities. Generally from about 1 to about 5 barrels per vertical foot of oil sand give significant increases to the efficiency of water injection into an injection well.

The mobility of the micellar dispersion is preferably about equal to or less than the mobility of the fluids in the reservoir ahead of the dispersion.

Preferably, the dispersion is injected into the formation at a pressure below the formation fracture pressure.

After injection of the micellar dispersion is completed, water is injected into the formation through the injection well. The micellar dispersion can remain in contact with the sands immediately adjacent the well bore for sufficient time to insure complete solubilization of the residual oil, e.g. up to about 6 hours or more. Thereafter, water can be injected to displace the dispersion out into the formation.

The following examples specifically illustrate working embodiments of the invention. It is not intended that the invention be limited to the exact petroleum constituents, surfactants, cosolvents, or procedures utilized. Rather, it is intended that all equivalents obvious to those skilled in the art be included within the scope of the invention as claimed. Unless otherwise specified, percents are based on volume.

Example 1

A flood is performed in a 2.5 acre five-spot containing four injection wells and a central producing well. The reservoir within the pattern is about 10 feet in thickness and at a depth of about 990 feet. One hundred barrels of a microemulsion made up of 56% crude column overhead, 32% water, 1.7% isopropanol, and containing 1% by weight NaOH and 0.15% nonyl phenol in the crude column overhead, are injected into the formation through each injection well at the rate of 60 barrels per day. Water injection, previously at the rate of 50 barrels per day, is readily increased to 103 barrels per day as the injected microemulsion is displaced toward a producing well.

Example 2

Fifty barrels of a micellar dispersion are injected into an injection well wherein the thickness of the oil-bearing sand is about 35 feet. The micellar dispersion is composed of 55.3% crude column overheads, 10% of ammonium sulfonate (80% active), 2.0% isopropanol, 0.2% n-nonyl phenol, and 32.2% water containing about 1% by weight of sodium hydroxide. The micellar dispersion is injected at a rate not to exceed 10 barrels per hour. Before treatment with the micellar dispersion, the water injection rate into the injection well was about 37 barrels per day and after treatment with the micellar dispersion the injection rate increased to 121 barrels per day, the injected pressure in both cases being about constant.

Example 3

The procedure of Example 2 is repeated except the sand thickness is about 24 feet. Sixty barrels of the micellar dispersion are injected into the injection well. Before treatment with the micellar dispersion, the rate of injected water was about 110 barrels per day at 610 p.s.i.g. but after treatment with the micellar dispersion the injected rate increased to 515 barrels per day at 620 p.s.i.g. This indicates an increase of 368.2% over the original injection rate.

Example 4

An injection well which had been cleaned out, swabbed, acidized, and reswabbed, had a water injection rate of 30 barrels per day at 700 p.s.i.g. This well is subjected to treatment identical with that described in Example 2 except the sand thickness was 25 feet and 12 barrels of the micellar dispersion are injected. After treatment with the micellar dispersion the water injection rate into the injection well increased to 101 barrels per day at 650 p.s.i.g. This indicates an increase of 236.6% over the original injection rate.

Example 5

The procedure of Example 2 is repeated on an injection well which had recently been cleaned out and pressure acidized. The sand thickness is 17 feet. Seventy barrels of the micellar dispersion are injected into the well. Before treatment with the micellar dispersion, the water injection rate was 18 barrels per day at 700 p.s.i.g. After treatment with the micellar dispersion, the injection rate increased to 50 barrels per day at 670 p.s.i.g. This indicates an increase of 177.8% over the original injection rate.

Example 6

An injection well has an injectivity index of 0.464. Sand thickness is about 27 feet. The injection well is first treated with a cleaning agent plus an acid flush combination—this increases the injectivity index to 2.10. Thereafter, 10 barrels of micellar dispersion per vertical foot of sand are injected into the well over a 16 hour period. The micellar dispersion has a composition of 38.2% crude oil, 52% water, 8.0% active ammonium sulfonate and 1.8% primary amyl alcohol. Water is then injected into the well. The dispersion and water are injected at a pressure below the formation fracture pressure. The injectivity index of the well is now 9.16, a percent increase of about 1870% over the original injectivity index and 335% over the injectivity index obtained by one of the newer standard well cleaning processes. This high injectivity index is being maintained during continuous injection of water.

What is claimed is:

1. A process for increasing the water injection rate of an injection well in a subterranean oil-bearing formation, the process comprising injecting into the formation an oil-external micellar dispersion in an amount sufficient to displace substantially all of the crude oil from no more than the pore space adjacent the well bore to a distance of from about 3 to about 20 feet.

2. The process of claim 1 wherein from about 0.25 to about 10 barrels per vertical foot of oil-bearing sand are injected into the formation.

3. The process of claim 1 wherein from about 1 to about 5 barrels of micellar dispersion per vertical foot of oil-bearing sand are injected into the subterranean formation.

4. A process of improving the injectivity index of an injection well in a subterranean oil-bearing formation, the process comprising injecting into the formation from about 0.25 to about 10 barrels of an oil-external micellar dispersion per vertical foot of oil-bearing sand and then continuing water injection into the injection well.

5. The process of claim 4 wherein from about 1 to about 5 barrels of the micellar dispersion are injected into the subterranean formation.

6. The process of claim 4 wherein the mobility of the micellar dispersion is about equal to or less than the mobility of the fluids in the formation ahead of the dispersion.

7. The process of claim 4 wherein the dispersion remains in contact with the oil-bearing sand for a time up to about 6 hours before water is injected into the formation.

8. The process of claim 4 wherein the micellar dispersion is injected at a pressure less than the formation fracture pressure.

9. A process of recovering crude oil from subterranean oil-bearing formations wherein an oil-displacing material is injected into a subterranean formation through at least one injection means and oil is produced from said formation through at least one production means, the step comprising injecting into said formation an oil-external micellar dispersion in an amount sufficient to displace substantially all of the oil from no more than the pore space adjacent the well bore to a distance of 3–20 feet.

10. The process of claim 9 wherein the volume of dispersion injected is sufficient to displace substantially all hydrocarbon from the pore space adjacent the well bore to a distance of from about 7 to about 15 feet.

References Cited

UNITED STATES PATENTS

| | | | |
|---|---|---|---|
| 3,254,714 | 6/1966 | Gogarty et al. | 166—9 |
| 3,266,570 | 8/1966 | Gogarty | 166—9 |
| 3,275,075 | 9/1966 | Gogarty et al. | 166—9 |
| 3,301,325 | 1/1967 | Gogarty et al. | 166—9 |
| 3,302,713 | 2/1967 | Ahearn et al. | 166—9 |
| 3,307,628 | 3/1967 | Sena | 166—9 |
| 3,348,611 | 10/1967 | Reisberg | 166—9 |
| 3,373,809 | 3/1968 | Cooke | 166—9 |

STEPHEN J. NOVOSAD, Primary Examiner

U.S. Cl. X.R.

166—275